(12) United States Patent
Kawashima et al.

(10) Patent No.: US 7,237,937 B2
(45) Date of Patent: Jul. 3, 2007

(54) TOUCH PANEL ASSEMBLY

(75) Inventors: Satoshi Kawashima, Shizuoka-ken (JP); Yoshitaka Chousa, Tokyo (JP); Takayuki Takagi, Kyoto (JP); Kazuhiro Nishikawa, Kyoto (JP); Takao Hashimoto, Kyoto (JP)

(73) Assignees: Minebea Co., Ltd., Nagano (JP); Nissha Printing Co., Ltd., Kyoto (JP); Nokia Corporation, Espoo (FI)

( * ) Notice: Subject to any disclaimer, the term of this patent is extended or adjusted under 35 U.S.C. 154(b) by 15 days.

(21) Appl. No.: 10/495,047

(22) PCT Filed: Nov. 6, 2002

(86) PCT No.: PCT/JP02/11562

§ 371 (c)(1),
(2), (4) Date: May 7, 2004

(87) PCT Pub. No.: WO03/040906

PCT Pub. Date: May 15, 2003

(65) Prior Publication Data

US 2005/0030728 A1 Feb. 10, 2005

(30) Foreign Application Priority Data

Nov. 9, 2001 (JP) ............................. 2001-344979

(51) Int. Cl.
*F12V 7/04* (2006.01)
*G09G 3/36* (2006.01)
*G09G 5/00* (2006.01)
*G02F 1/1335* (2006.01)
*G02F 1/1333* (2006.01)

(52) U.S. Cl. ............... 362/602; 345/104; 345/173; 349/12; 349/60; 362/633; 362/616

(58) Field of Classification Search ............... 362/612, 362/602, 633, 616; 345/104, 173; 349/12, 349/60
See application file for complete search history.

(56) References Cited

U.S. PATENT DOCUMENTS 5,659,376 A * 8/1997 Uehara et al. ............... 349/58

(Continued)

FOREIGN PATENT DOCUMENTS

EP 0 969 311 A1 1/2000

(Continued)

*Primary Examiner*—Sandra O'Shea
*Assistant Examiner*—David Makiya
(74) *Attorney, Agent, or Firm*—The Nath Law Group; Jerald L. Meyer; Matthew J. Moffa

(57) ABSTRACT

In a touch panel assembly, the thickness of a touch panel is successfully reduced by using a touch panel 10 provided with no reinforcement member. A housing frame 50 that supports the components of a front light unit 20 in an integral manner is provided with a touch panel positioning mechanism, and the touch panel 10 is fixed to the positioning mechanism, whereby the absence of a reinforcement member is duly compensated for, thus ensuring the strength of the touch panel 10. Deformation of the touch panel 10 that occurs when the touch panel 10 is pressed for operation can be attenuated by a transparent buffer member 5 disposed between the touch panel 10 and a light conductor plate 22. Therefore, the touch panel 10 deformed is prohibited from contacting and damaging the light conductor plate 22, thus preventing the light conductor plate 22 from deteriorating in its functional performance. Consequently, reduction in dimension and reduction of the number of components can be achieved without deteriorating the functional performance of the touch panel assembly.

15 Claims, 8 Drawing Sheets

U.S. PATENT DOCUMENTS

| | | | |
|---|---|---|---|
| 6,456,279 B1 * | 9/2002 | Kubo et al. | 345/173 |
| 6,685,328 B1 * | 2/2004 | Hanson et al. | 362/610 |
| 6,771,327 B2 * | 8/2004 | Sekiguchi | 349/12 |
| 2001/0043291 A1 * | 11/2001 | Kono et al. | 349/12 |
| 2002/0106182 A1 * | 8/2002 | Kawashima | 385/146 |
| 2003/0011720 A1 * | 1/2003 | Kawashima et al. | 349/12 |

FOREIGN PATENT DOCUMENTS

| | | |
|---|---|---|
| JP | 02-208713 | 8/1990 |
| JP | 02208713 A * | 8/1990 |
| JP | 06-324804 | 11/1994 |
| JP | 08-272532 | 10/1996 |
| JP | 11-344695 | 12/1999 |
| JP | 2000-011723 | 1/2000 |
| JP | 2001-200221 | 7/2001 |
| JP | 2001200221 A * | 7/2001 |
| JP | 2002-287119 | 10/2002 |
| TW | 147211 | 3/1990 |
| WO | 99/63394 A1 | 12/1999 |

* cited by examiner

TOUCH PANEL ASSEMBLY

TECHNICAL FIELD

The present invention relates to a touch panel assembly that is disposed close to the display screen of a display device such as a liquid crystal display device, and that generates, when an operator presses the panel surface (corresponding to the display screen) at a desired position with a pen or his or her finger on the basis of information displayed on the display screen, a prescribed signal corresponding to the pressed position.

BACKGROUND ART

Touch panels of this type allow the area corresponding to the display screen of the display device to be used for both information display and information input thereby increasing the efficiency of utilization of that area. Therefore, the demand for touch panels of this type is becoming increasingly greater for use in small-size information processing devices and communication devices, in particular, portable communication terminals and the like.

FIG. 8 is a sectional view of a conventional touch panel assembly 1 including a front light unit 20 that is a kind of spread illuminating device. FIG. 9 is a sectional view showing a detailed structure of a touch panel 10 of the touch panel assembly 1 of FIG. 8. First of all, basically, the touch panel 10 comprises a pair of resistor layers (first and second resistor layers) 12 and 13 that are opposed to each other with a plurality of insulating dot spacers 11 interposed therebetween, and a transparent flat plate (e.g., transparent polyethylene terephthalate (hereinafter abbreviated as PET) film 16) for protection of the second resistor layer 13. The second resistor layer 13 is formed on the PET film 16, and the touch panel 10 is disposed in such a manner that the PET film 16 faces the display screen of a display device 30 such as a reflection-type color liquid crystal display device. The first and second resistor layers 12 and 13 are connected to each other at their peripheral portions by means of sealing members 14 for dust-proof and water-proof construction.

With the above structure, if the outer surface of the first resistor layer 12 is pressed, a pressed portion of the first resistor layer 12 is brought into contact with a portion of the second resistor layer 13 that is opposed to the pressed portion, and a signal corresponding to the contact position (i.e. pressed position) is generated.

In practice, a transparent layer (e.g., PET film 15) for protection of the resistor layer is also laid on the outer surface of the first resistor layer 12 and hence a pressing operation is performed actually on the PET film 15. Further, the PET film 16 is integrally attached to a touch panel support plate 17 that is a reinforcement member for securing sufficient strength (i.e., strength high enough to prevent a significant deformation of the second resistor layer 13 when the first resistor layer 12 of the touch panel 10 is pressed for operation). The touch panel support plate (reinforcement member) 17 is constituted by a transparent plate made of polycarbonate or the like, and is two or more times as thick as the touch panel 10 in the illustrated example. In other examples not shwon, the touch panel support plate 17 may be constituted by a glass plate, and also a thick glass plate (reinforcement member) may be used in place of the PET film 16 thus not providing the touch panel support plate 17 discretely.

As described above, the touch panel assembly 1 includes the front light unit 20. The front light unit 20 is adapted to irradiate light on the display screen of the display device 30 from its front side (i.e., from the display screen side) thereby illuminating the display screen brightly to enhance visibility. The front light unit 20 is disposed such that a light conductor plate 22 faces the display screen of the display device 30, and functions such that light emitted from a rod-like lamp 21 disposed beside the light conductor plate 22 is guided to be eventually irradiated onto the display screen of the display device 30 via the light conductor plate 22. The light that has reached the display device 30 is reflected either at the display screen or inside the display device 30, then passes through the light conductor plate 22 and the touch panel 10, and exits out thereby enabling displayed information on the display screen to be visible.

FIG. 10 shows basic components of the front light unit 20. The front light unit 20 is mainly composed of the light conductor plate 22 and the rod-like lamp 21, and is disposed in such a manner that the bottom surface of the light conductor plate 22 is opposed to the display screen of the display device 30 (see FIG. 8). The top surface of the light conductor plate 22 is formed with a light reflecting pattern that consists of a plurality of grooves 22a having a generally triangular cross-section and a plurality of flat portions 22b adjacent to respective grooves 22a. The interval between the grooves 22a of the light reflecting pattern varies depending on the position so that the brightness becomes approximately uniform at any positions of the light conductor plate 22 irrespective of the distance from the rod-like lamp 21. Specifically, the ratio of the width (occupation area) of the groove 22a to the width (occupation area) of the flat portion 22b is set so as to increase gradually as the distance from the rod-like lamp 21 increases. The grooves 22a of the light reflecting pattern that are formed on the light conductor plate 22 are very fine and hence cannot be recognized visually when one observes the screen. In another example, the light reflecting pattern may consist of only grooves (i.e., no flat portion is provided).

The rod-like lamp 21 is composed of a light conductor rod 23 that is a rod-like transparent member and a point light source 24 that is disposed adjacent to at least one of the two ends of the light conductor rod 23. The point light source 24 is a light-emitting diode. The light conductor rod 23 that is made of a transparent material is disposed along one end surface of the light conductor plate 22. The point light source 24 is disposed close to one end of the light conductor rod 23. On the other hand, the light conductor rod 23 is formed with an optical path changing means 23a. In the illustrated example, the optical path changing means 23a is such that grooves having a generally triangular cross-section are arranged in the longitudinal direction of the light conductor rod 23 in a predetermined manner.

The surfaces of the rod-like lamp 21 extending in the longitudinal direction, except for one surface opposed to the light conductor plate 22, are covered with a light reflecting member (reflector) 25 so that light is guided into the light conductor plate 22 with high efficiency. The light reflecting member 25 is a sheet-like member such as a film on which a metal such as silver is evaporated, a white film, or a film to which a white paint is applied, or a metal plate such as an aluminum plate that is mirror-finished and bent. As shown in FIG. 8, the rod-like lamp 21 that is covered with the light reflecting member 25 is further covered with a reinforcement frame 26 made of a metal such as stainless steel so as to be resistant to external impact.

As shown in FIG. 8, the components of the front light unit 20 are put and held together in place by means of a top frame 27 and a bottom frame 28 and are incorporated inside a portable communication terminal or the like. The top frame 27 and the bottom frame 28, each of which is a sheet metal part configured in an open-top box, can house the front light unit 20 and the display device 30 in an integral manner. The touch panel support plate 17 of the touch panel 10 is laid on the top surface of the top frame 27. The components are implemented as a unit in this manner, and hence the handleability in assembling or disassembling work can be increased. In this connection, in FIG. 8, reference numerals 41 and 42 denote double-sided adhesive tapes, reference numeral 43 denotes a cushion interposed between the reinforcement frame 26 and the display device 30, and reference numeral 31 denotes a polarizer plate that is usually provided on the display screen of the display device 30.

The conventional touch panel assembly 1 having the above configuration, however, has the following problems. First, the conventional touch panel assembly 1 is configured in such a manner that the touch panel 10 having the touch panel support plate 17 is laid on the top surface of the top frame 27, and this configuration, while giving advantages that the front light unit 20 and the display device 30 are protected from external force, the components are implemented as a unit, and that the touch panel 10 itself is surely provided with a sufficient strength, increases the total thickness thus making it difficult to reduce the size and the thickness of the touch panel assembly 1. As the total thickness increases, the distance between the display screen of the display device 30 and the touch panel 10 increases, and an observer more likely feels uncomfortable (the depth perception of the screen). If the touch panel support plate 17 is removed for reduction of the thickness, when the first resistor layer 12 of the touch panel 10 is pressed for operation, the second resistor layer 13 is deformed and brought into contact with the light conductor plate 22 possibly giving damages to the light reflecting pattern, which results in a problem that the functional performance of the light conductor plate 22 is deteroprated.

Where the touch panel support plate 17 is constituted by a glass plate, it is necessary to take a sufficient anti-impact measure to prevent breakage of the glass plate. Further, when the bottom frame 28 is screwed to a case (main body) of a communication terminal or the like, resin spacers must be disposed at screwing positions, which inevitably increases the number of components.

The present invention has been made in view of the above problems, and an object of the invention is therefore to achieve reduction in size and thickness of a touch panel assembly and also reduction of the number of components without deteriorating the functional performance of the touch panel assembly. Another object of the invention is to increase the degree of freedom in selecting the materials of components of the touch panel assembly to thereby make it possible to flexibly answer various requirements about products.

DISCLOSURE OF THE INVENTION

In order to achieve the above objects, according to claim 1 of the present invention, there is provided a touch panel assembly comprising:

a spread illuminating device which comprises a light conductor plate made of a transparent material, and a rod-like lamp composed of a light conductor rod made of a transparent material and disposed close to and along at least one of the end surfaces of the light conductor plate, and a point light source disposed adjacent to at least one of two ends of the light conductor rod, and in which light, that is emitted from the rod-like lamp, falls incident on the end surface of the light conductor plate and is introduced into the light conductor plate, exits out of the light conductor plate from its major surface toward a display portion of a liquid crystal display device.

In the touch panel assembly, a housing frame to support components of the spread illuminating device in an integral manner is provided with a positioning mechanism for a touch panel, and a touch panel provided with no reinforcement member is fixed to the positioning mechanism fixedly attached.

With this configuration of the touch panel having no reinforcement member, the thickness of the touch panel itself is reduced. Further, since the housing frame to support the components of the spread illuminating device in an integral manner is provided with the touch panel positioning mechanism, and since the touch panel is fixed to the positioning mechanism, the absence of a reinforcement member is duly compensated for, thus ensuring the strength of the touch panel.

According to claim 2 of the present invention, the touch panel positioning mechanism may be constituted by a recess formed in the housing frame. This configuration facilitates positioning of the touch panel and makes it possible to diminish the projection length of the touch panel from the front surface of the housing frame or even to reduce the projection to zero when the touch panel is fixed to the housing frame.

According to claim 3 of the present invention, a transparent buffer member may be disposed between the touch panel and the light conductor plate. The touch panel with no reinforcement member, when pressed for operation, may be deformed so as to be brought into contact with the light conductor plate, but with the above configuration, the transparent buffer member disposed between the touch panel and the light conductor plate elastically prohibits contact therebetween. Therefore, a light reflecting pattern that is formed on the light conductor plate is prevented from being damaged, and the light conductor plate is prevented from deteriorating in its functional performance.

According to claim 4 of the present invention, the transparent buffer member may be provided so as to keep clear of a portion of the spread illuminating device, at which the spread illuminating device defines its maximum thickness. This configuration makes it possible to prevent increase in the total thickness of the assembly which otherwise results from providing the transparent buffer member between the touch panel and the light conductor plate.

According to claim 5 of the present invention, the transparent buffer member may be composed of a polyethylene terephthalate film and a transparent gel layer. This configuration utilizes the mechanical property of the transparent gel layer which, together with the polyethylene terephthalate film, constitutes the transparent buffer member interposed between the light conductor plate and the transparent flat plate, and makes it possible to attenuate deformation of the touch panel that occurs when the touch panel is pressed for operation and to attenuate vibration or impact that is transmitted to the light conductor plate when vibration or impact is exerted on the touch panel.

According to claim 6 of the present invention, the polyethylene terephthalate film may be either an AR film or an LR film. With this configuration, the AR film or LR film, which, together with the transparent gel layer, is interposed between the light conductor plate and the transparent flat plate, effectively prevents light reflected at the display screen of the display device from being reflected by the touch panel while traveling outward.

According to claim 7 of the present invention, the transparent buffer member may be formed such that either a liquid buffer material or a gel-like buffer material is coated on a surface of the touch panel and a coat surface of the buffer material is hardened for eliminating stickiness. This configuration utilizes the mechanical property of the liquid or gel-like buffer material coated on the surface of the touch panel, and makes it possible to attenuate deformation of the touch panel that occurs when the touch panel is pressed for operation and to attenuate vibration or impact that is transmitted to the light conductor plate when vibration or impact is exerted on the touch panel. In addition, since stickiness is eliminated at the coat surface of the buffer material, the buffer member configured above can be handled as easily as the buffer member composed of the polyethylene terephthalate film and the transparent gel layer.

According to claim 8 of the present invention, a thickness of either the polyethylene terephthalate film or the coat surface portion of the buffer material hardened for eliminating stickiness may be set to range from 10 to 500 µm. This configuration provides the transparent buffer member with requisite flexibility, and enables the buffer member to disperse force that is generated when the touch panel is pressed toward the light conductor plate to thereby efficiently prevent the touch panel and the light conductor plate from being damaged.

According to claim 9 of the present invention, a thickness of either the transparent gel layer or an unhardened portion of the liquid or gel-like buffer material coated on the surface of the touch panel may be set to range from 50 to 500 µm. This configuration makes it possible to attain the buffer effect without significantly influencing the total thickness.

According to claim 10 of the present invention, a gap ranging from 10 m to 1 mm may be provided between the transparent buffer member and the light conductor plate. With this configuration, the transparent buffer member can further reliably prevent the touch panel and the light conductor plate from being damaged by the impact that occurs when the touch panel is pressed for operation.

According to claim 11 of the present invention, a transparent flat plate that constitutes the touch panel having no reinforcement member may be a thin tempered glass plate. The touch panel with no reinforcement member, when pressed for operation, is possibly deformed so as to be brought into contact with the light conductor plate, but the transparent buffer member disposed between the touch panel and the light conductor plate elastically prohibits contact therebetween and attenuates impact. Therefore, the degree of freedom in selecting the material of the transparent flat plate can be increased, and a thin tempered glass plate as well as a polyethylene terephthalate film can be used as the transparent flat plate.

According to claim 12 of the present invention, the housing frame may be a resin molded part. This configuration increases the degree of freedom in selecting the shape of the housing frame and allows the housing frame to be formed with a touch panel positioning mechanism. In addition, if engagement mechanisms for engagement with a bottom frame of a sheet metal are formed directly in the housing frame, resin parts can be omitted that are conventionally provided in the bottom frame as independent members for attachment of the touch panel assembly.

BEST MODE FOR CARRYING OUT THE INVENTION

The best mode for carrying out the invention will hereinafter be described with reference to the drawings. Components, etc. having the same or corresponding ones in the conventional technique are given the same reference symbols, a detailed explanation thereof will be omitted.

In the following description, such terms as "top surface," "bottom surface," "side surface," "above," "below," and "beside" are used for the convenience of description for expressing positional relationships between members in FIGS. 1 and 2 that are sectional views of a pertinent part of a touch panel assembly according to the best mode for carrying out the invention. Therefore, when a touch panel assembly according to the best mode for carrying out the invention is incorporated in an electronic product such as a cellular phone and a personal computer and is used actually, for example, the "top surface" may not necessarily be located above the "bottom surface."

Figure 1:
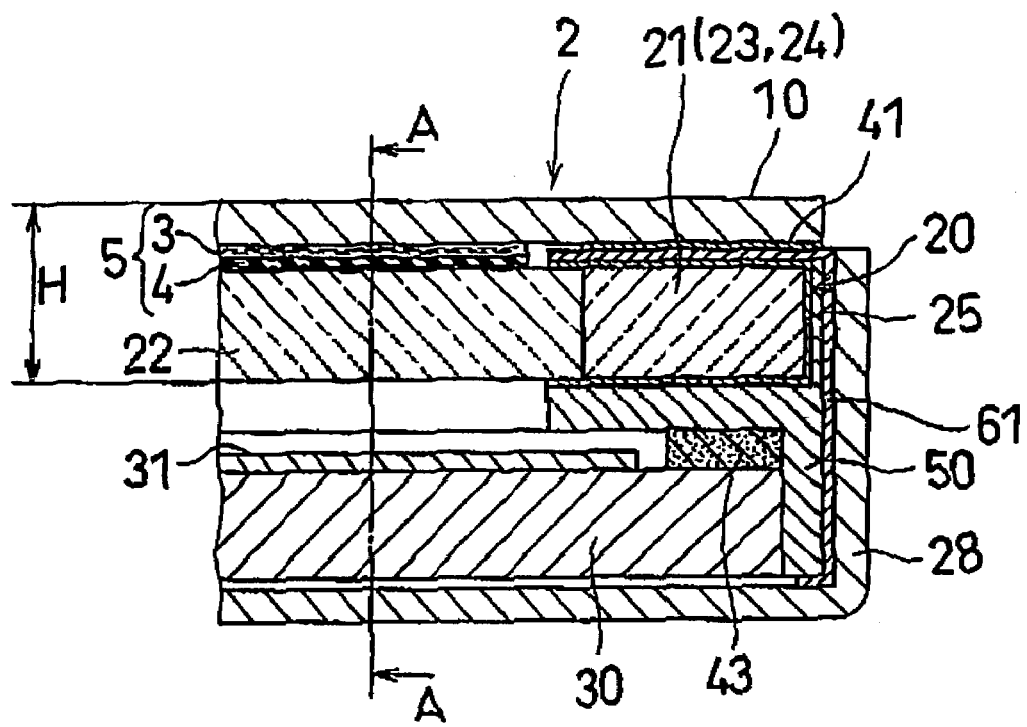
FIG. 1 is a sectional view of a pertinent part of a touch panel assembly according to the best mode for carrying out the invention.
Figure 2:
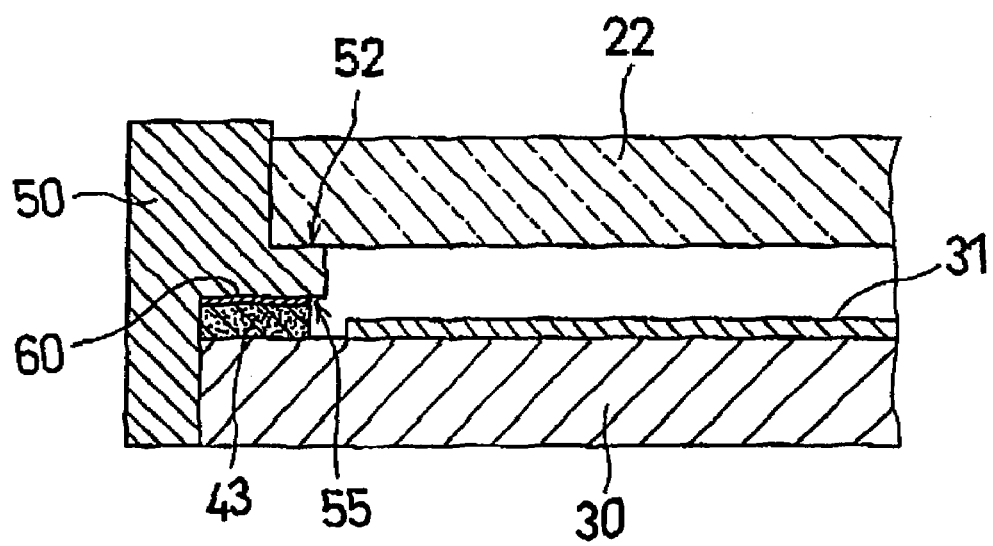
FIG. 2 is a sectional view of the touch panel assembly taken along line A-A in FIG. 1 and shows only relevant components.
Figure 3:
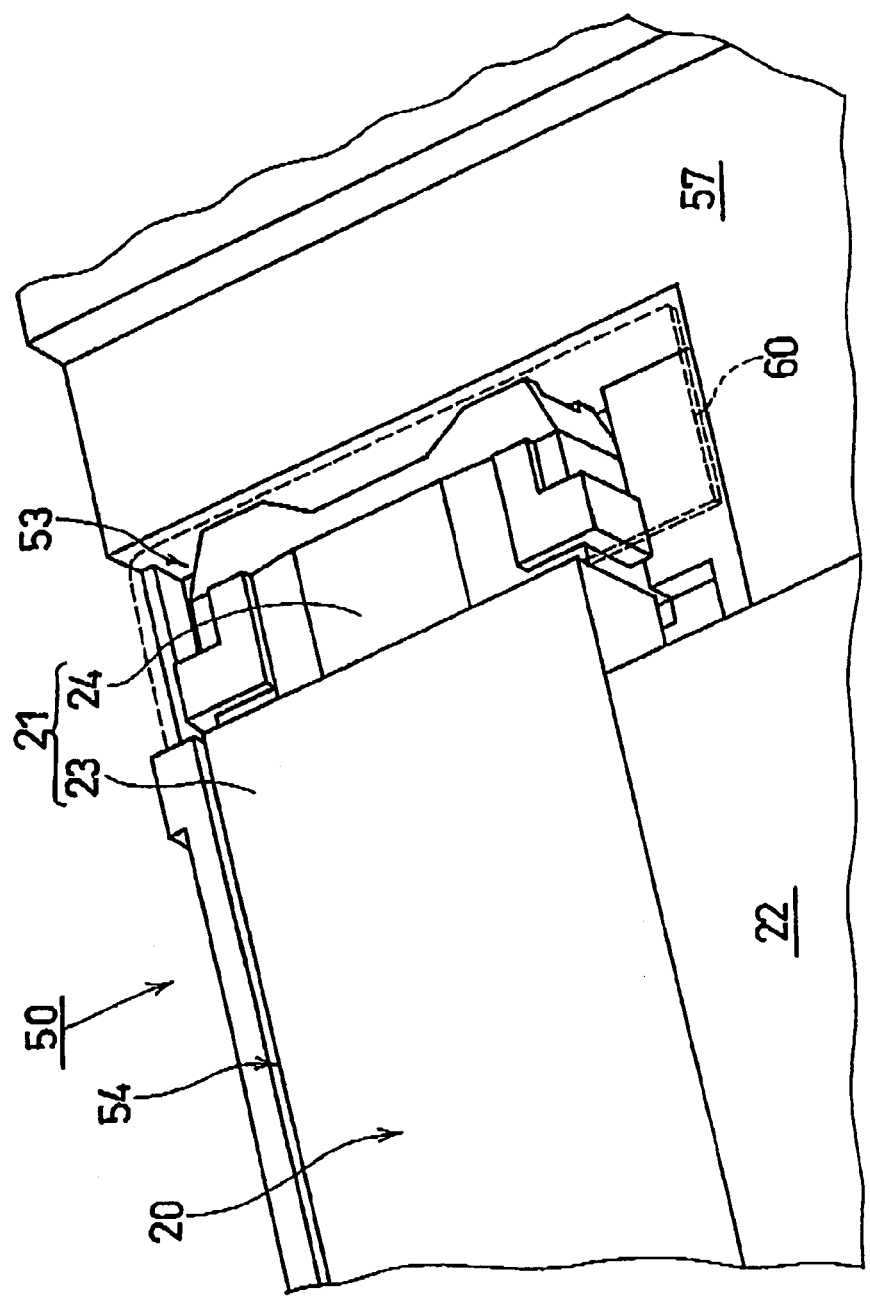
FIG. 3 is a perspective view of a pertinent part of a spread illuminating device provided in the touch panel assembly of FIG. 1.

FIG. 1 is a sectional view of a pertinent part of a touch panel assembly 2 according to the best mode for carrying out the invention. FIG. 2 is a sectional view of the touch panel assembly 2 taken along line A-A in FIG. 1 and shows relevant components only. And, FIG. 3 is a perspective view of a pertinent part of a spread illuminating device provided in the touch panel assembly 2 of FIG. 1.

Figure 8:
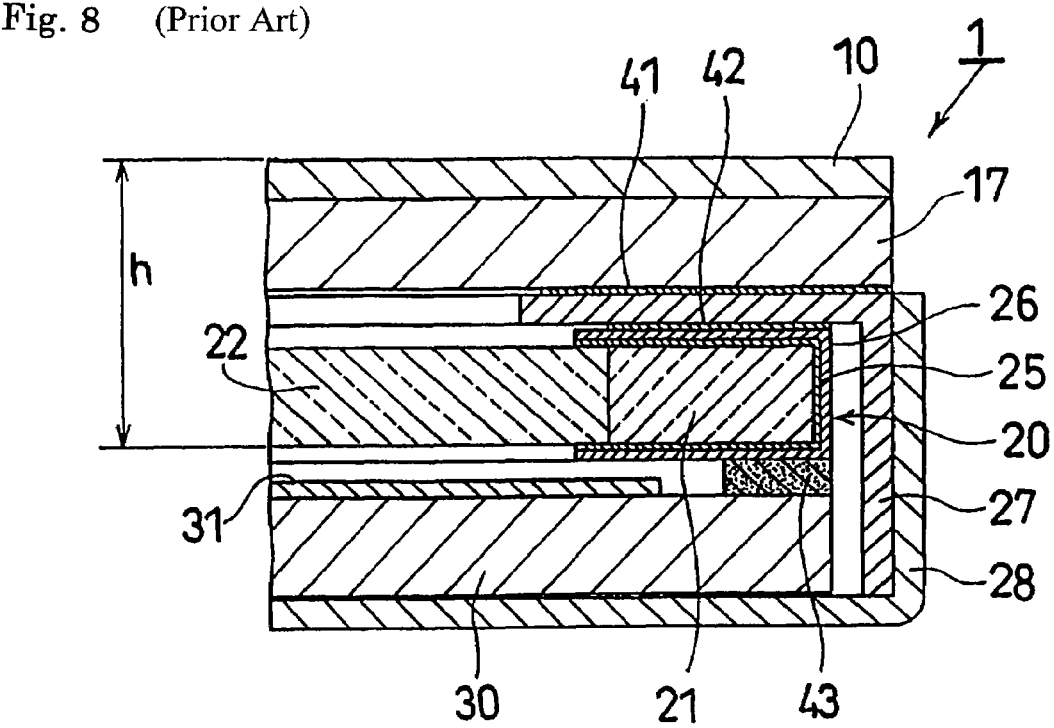
FIG. 8 is a sectional view of a pertinent part of a conventional touch panel assembly.
Figure 9:
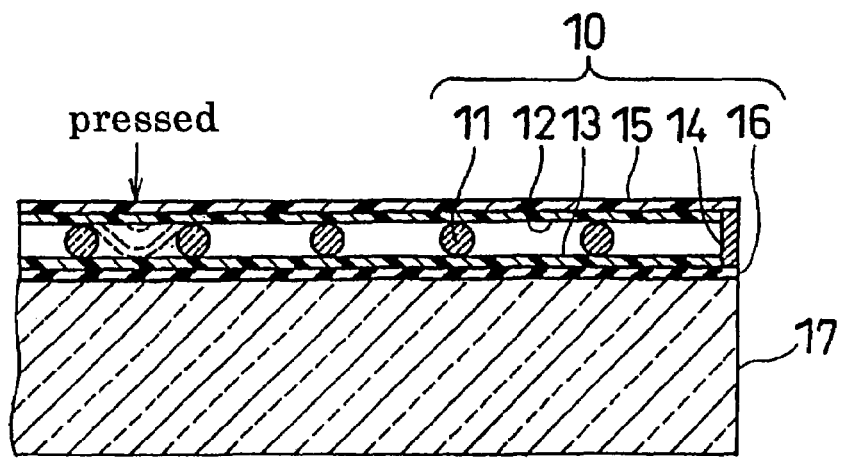
FIG. 9 is a sectional view showing a detailed structure of a touch panel of the conventional touch panel assembly of FIG. 8.
Figure 10:
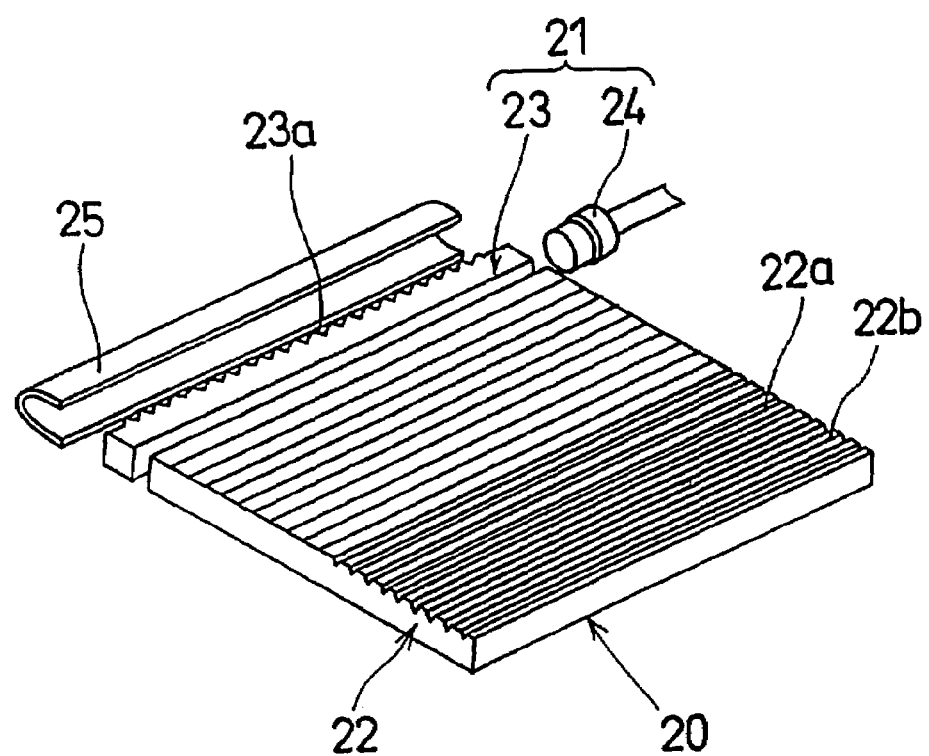
FIG. 10 is a perspective view showing a basic structure of a front light unit of the conventional touch panel assembly of FIG. 8.

It should be pointed out first that an important feature of the touch panel assembly 2 according to the best mode for carrying out the invention is that it employs a touch panel 10 having no reinforcement member (see reference numeral 17 in FIG. 8). Next, a housing frame 50 that supports the components of a front light unit 20 in an integral manner is a resin molded part. Further, a transparent buffer member 5 is interposed between the touch panel 10 having no reinforcement member and a light conductor plate 22 of the front light unit 20. Among the above characterizing features, the touch panel 10 of the invention is structured identically with the conventional touch panel 10 described above (see FIG. 9) except that the former does not have the reinforcement member 17, and a detailed description thereof will be omitted.

The housing frame 50 will be described below with reference to FIG. 4 (top view), FIG. 5 (side view), and FIG. 6 (bottom view).

Figure 4:
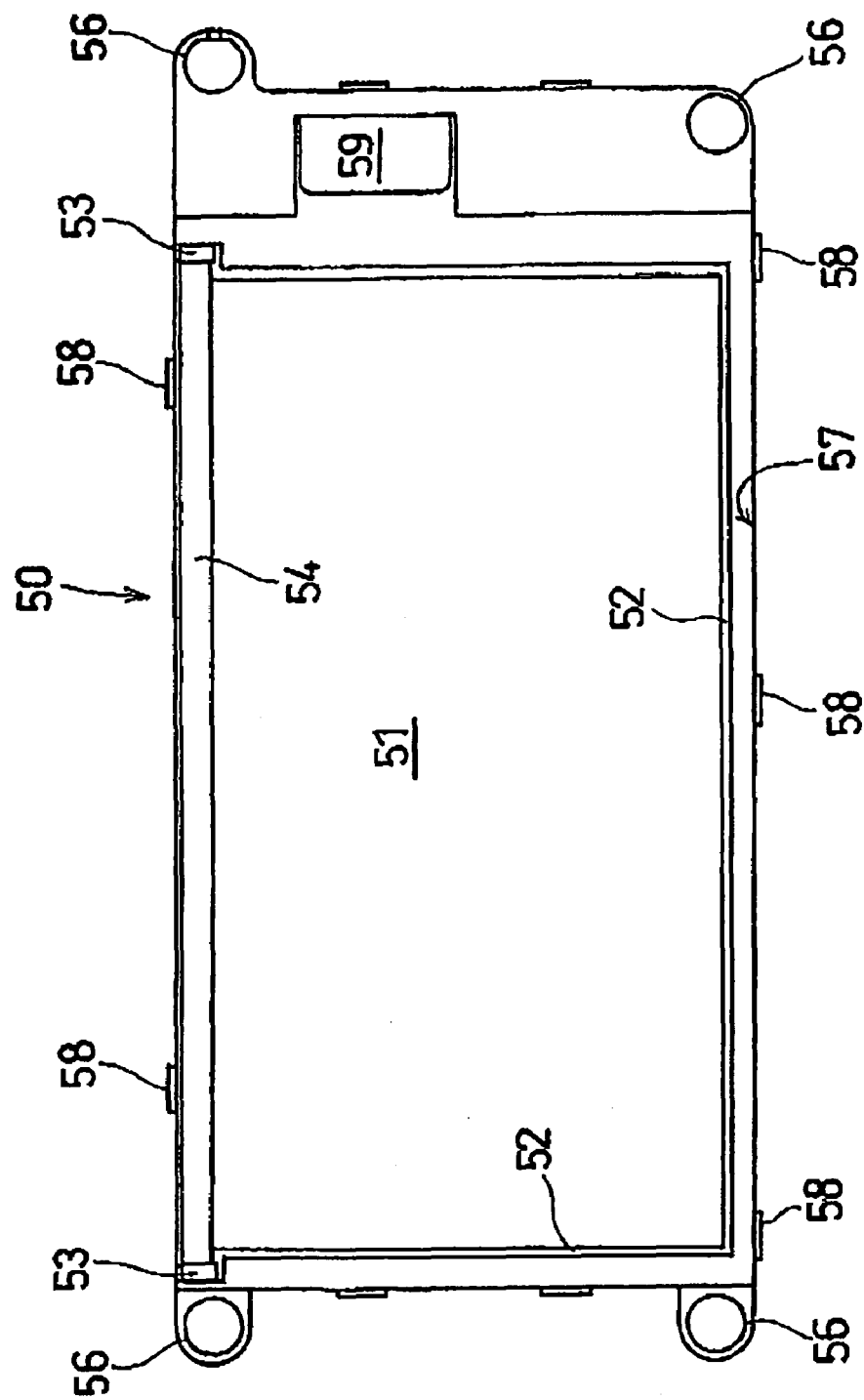
FIG. 4 is a top view of a housing frame of the touch panel assembly of FIG. 1.
Figure 5:
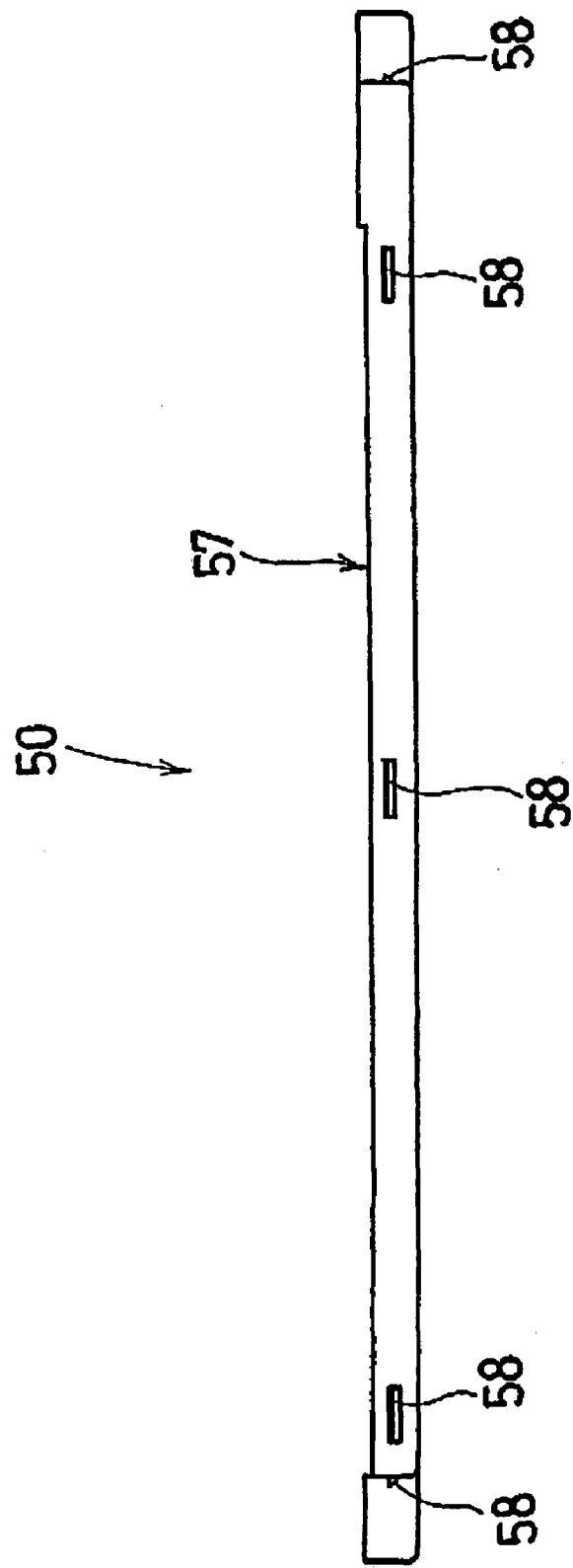
FIG. 5 is a side view of the housing frame of the touch panel assembly of FIG. 1.

The housing frame 50, which is a frame-like resin molded part, has a frame-like seat 52 as a mechanism for positioning the light conductor plate 22, formed on the top surface side of the inner peripheral area thereof defining an opening 51 (see FIG. 4). And, recesses 53 as a mechanism for positioning a point light source 24, and a planar seat 54 as a mechanism for positioning a light conductor rod 23 are formed along one sideline (top sideline in FIG. 4) of the housing frame 50. FIG. 3 is a perspective view showing a state how the point light source 24 and the light conductor rod 23 are attached to the mechanisms described above.

Figure 6:
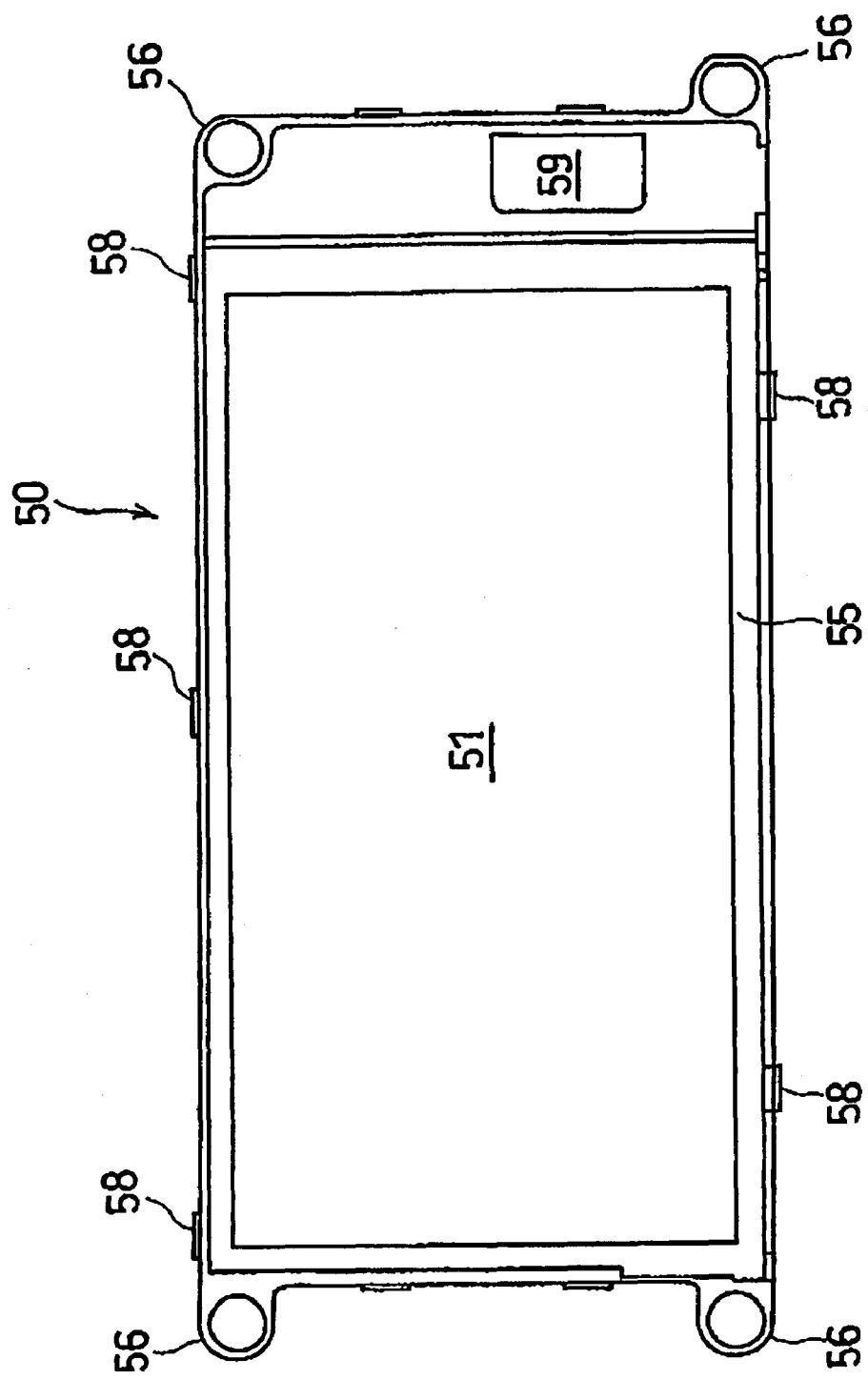
FIG. 6 is a bottom view of the housing frame of the touch panel assembly of FIG. 1.
Figure 7:
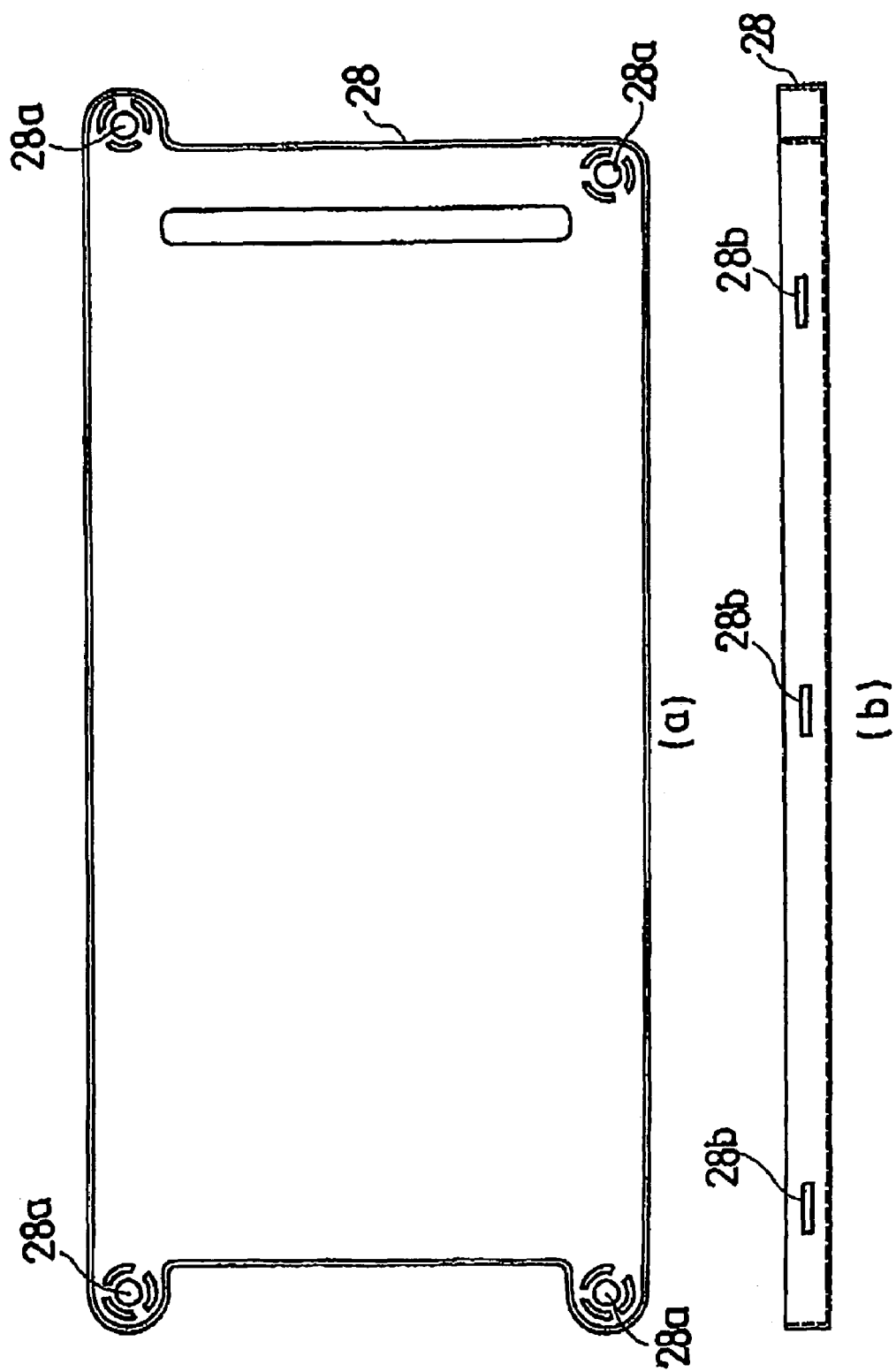
FIG. 7 shows a bottom frame of the touch panel assembly of FIG. 1, in which part (a) is a top view and part (b) is a side view.

On the other hand, a frame-like seat 55 in which a display device is fitted is formed on the bottom surface side of the inner peripheral area of the housing frame 50 (see FIG. 6). Further, the housing frame 50 is provided with engagement mechanisms 56 for engagement with a bottom frame 28 made of a metal sheet. The engagement mechanisms 56 are located so as to correspond to respective engagement mechanisms 28a of the bottom frame 28 shown in FIG. 7 (plan view (a) and side view (b)) and serve to screwingly fasten the device case.

The front surface (top surface) of the housing frame 50 is formed with a recess 57 which is configured to conform to the outline of the touch panel 10 and which receives the touch panel 10 thereon. The recess 57 (positioning mechanism) facilitates positioning of the touch panel 10 with respect to the housing frame 50 and at the same time makes it possible to reduce the total thickness. Reference numeral 58 denotes fitting nails to engage with respective fitting holes 28b of the bottom frame 28. Reference numeral 59 denotes an opening through which an FPC 60 (see FIG. 3) passes that has the point light source 24 of the front light unit 20 mounted thereon.

Next, a buffer member 5 will be described. The buffer member 5 (see FIG. 1) is composed of a PET film 4 and a transparent gel layer 3. It is preferable to use an AR (anti-reflection) film formed by performing anti-reflection treatment on the surface of a PET film as a base member. The AR film may be replaced by an LR (low-reflection) film that provides an anti-reflection property at a relatively low cost. On the other hand, the transparent gel layer 3 is made of a transparent gel-like substance such as a silicone resin or an acrylic resin. The transparent gel layer 3 is applied to the surface of the PET film 4 and handled integrally with the PET film 4. The material of the buffer member 5 is not limited to gel-like substance and may be any substance as long as it is transparent and has a buffer function.

Alternatively, the buffer member 5 may be formed such that a liquid or gel-like material is coated on the surface of the touch panel 10 and has its coat surface hardened for elimination of stickiness. In this case, a thermosetting resin or the like can be used as the liquid or gel-like material.

With the above characterizing features, the components are integrally put together with each other in the following manner to form the touch panel assembly 2. First, the front light unit 20 is attached to the housing frame 50 at a prescribed position on the top surface side, and is fixed to the housing frame 50 by means of a reinforcement frame 61 that is made of a metal such as stainless steel. A cushion 43 as a buffer member is provided between the bottom surface of the housing frame 50 and the display device 30. At this time, to keep clear of a polarizer plate 31 that is provided on the display screen of the display device 30 and to effectively utilize the space between the display device 30 and the light conductor plate 22, the FPC 60 is disposed so as to be interposed between the frame-like seat 55 of the housing frame 50 and the cushion 43 as shown in FIG. 2. The bottom frame 28 is then fixedly attached to the housing frame 50 from below, whereby the front light unit 20 and the display device 30 are fixed to the housing frame 50 in an integral manner.

Then, the touch panel 10 which has the buffer member 5 stuck on its bottom surface is attached to the recess 57 (see FIG. 4) of the front surface (top surface) of the housing frame 50, whereby the touch panel 10 is also fixed to the housing frame 50 in an integral manner. As shown in FIG. 1, the buffer member 5 is provided so as to keep clear of the area around the light conductor rod 23, at which the front light unit 20 defines its maximum thickness (where a reinforcement frame 61 is laid on a light reflecting member 25 enclosing the light conductor rod 23).

Advantages attained by the best mode for carrying out the invention having the above-described structure are as follows. First, the touch panel assembly 2 according to the best mode for carrying out the invention employs the touch panel 10 having no reinforcement member, whereby the thickness of the touch panel itself is reduced. The housing frame 50 that integrally supports the components of the front light unit 20 (i.e., the light conductor plate 22, light conductor rod 23, point light source 24, light reflecting member 25, and reinforcement frame 61) is formed with the recess 57 as the mechanism for positioning the touch panel 10, and the touch panel 10 is fixedly attached to the recess 57, thereby compensating for the absence of a reinforcement member in the touch panel 10. The transparent buffer member 5, which is interposed between the touch panel 10 and the light conductor plate 22, elastically prohibits contact therebetween and attenuates impact that is caused by the touch panel 10 which, when pressed for operation, is moved toward the light conductor plate 22 due to the absence of the reinforcement member. Therefore, the touch panel 10 deformed is kept from touching and damaging the light conductor plate 22, thus eliminating a problem of deteriorated functional performance of the light conductor plate 22.

As described above, the touch panel assembly 2 can be made thinner than the conventional touch panel assembly 1 (see FIG. 8) without suffering deterioration in its functional performance thereby successfully achieving dimensional reduction. In particular, the thickness H (see FIG. 1) from the top surface of the touch panel 10 to the bottom surface of the light conductor plate 22 is much smaller than the corresponding thickness h of the conventional touch panel assembly 1 (see FIG. 8). For example, the thickness H is 1.7 mm in the illustrated example; that is, the thickness H can be smaller than the thickness h of the conventional touch panel assembly 1 by 1 mm or more.

In the touch panel assembly 2 according to the best mode for carrying out the invention, the front surface of the housing frame 50 is formed with the recess 57 that is configured so as to conform to the outline of the touch panel 10, whereby the recess 57 serves as the mechanism for positioning the touch panel 10. With this structure, the projection length of the touch panel 10 from the front surface of the housing frame 50 can be diminished or even reduced to zero when the touch panel 10 is fixed to the housing frame 50. In this embodiment, the depth of the recess 57 as measured from the front surface of the housing frame 50 is made equal to the sum of the thickness of the touch panel 10 and the thickness of a double-sided adhesive tape 41 (see FIG. 1). As a result, the projection length of the touch panel from the front surface of the housing frame 50 is zero thus contributing to reduction in the thickness of the touch panel assembly 2.

The transparent buffer member 5 is provided on the touch panel 10 so as to avoid the area around the light conductor rod 23, at which the front light unit 20 defines its maximum thickness. This prevents increase in the total thickness of the touch panel assembly 2 that would otherwise take place due to provision of the transparent buffer member 5 between the touch panel 10 and the light conductor plate 22.

In addition, the transparent buffer member 5 is composed of the PET film 4 and the transparent gel layer 3. This, by utilizing the mechanical property of the transparent gel layer 3, helps attenuate deformation of the touch panel 10 that occurs when the touch panel 10 is pressed for operation and also helps attenuate vibration or impact that is transmitted to the light conductor plate 22 when vibration or impact is exerted on the touch panel 10. Further, if the PET film 4 is an AR film or LR film, light reflected at the display device 30 and traveling outward is effectively prevented from being reflected by the touch panel 10. This prevents deterioration in the visibility of the display device 30 which is viewed through the touch panel 10.

When the transparent buffer member 5 is alternatively formed such a liquid or gel-like material is coated on the surface of the touch panel 10 and has its coat surface hardened for elimination of stickiness, it is made possible due to the mechanical property of the liquid or gel-like buffer material that deformation of the touch panel 10 which occurs when the touch panel 10 is pressed is attenuated and also that vibration or impact which is transmitted to the light conductor plate 22 when vibration or impact is exerted on the touch panel 10 is attenuated. In addition, since the coat surface of the liquid or gel-like material is hardened and has its stickiness eliminated, the buffer member 5 thus formed can be handled as easily as the buffer member 5 composed of the PET film 4 and the transparent gel layer 3 applied to the PET film 4.

Incidentally, when the thickness of the PET film 4 or the portion of a liquid or gel-like material hardened for eliminating stickiness is set to range from 10 to 500 µm, preferably from 20 to 100 µm, the transparent buffer member 5 is duly provided with requisite flexibility, which makes it possible to disperse force that is generated when the touch panel 10 is pressed for operation toward the light conductor plate 22 thus efficiently preventing the touch panel 10 and the light conductor plate 22 from being damaged. The transparent buffer member 5 can duly perform the buffer function even when it is disposed in contact with the light conductor plate 22, but if a gap ranging from 10 µm to 1 mm is provided between the transparent buffer member 5 and the light conductor plate 22, then the touch panel 10 and the light conductor plate 22 can be prevented from damages with an increased reliability thus proving to be effective in preventing deterioration of the functional performance of the light conductor plate 22. It has been found out that a sufficient buffer effect can be obtained without significantly influencing the total thickness if the thickness of a buffer material is generally set to range from 50 to 500 µm, preferably from 50 to 200 µm, depending on the properties of the material.

Further, in the touch panel assembly 2 according to the best mode for carrying out the invention, deformation of the touch panel 10 that occurs when the touch panel 10 is pressed for operation, and vibration or impact that is transmitted to the light conductor plate 22 when vibration or impact is exerted on the touch panel 10 can be attenuated by utilizing the mechanical property of the transparent buffer member 5. Therefore, a thin tempered glass plate as well as a PET film can be used as a transparent flat plate 16 that constitutes the touch panel 10.

Increasing the degree of freedom in selecting the material of the transparent flat plate 16 makes it possible to flexibly cope with requirements about products. The thickness of a thin tempered glass plate can be set at the same dimension as that of a PET film.

In the touch panel assembly 2 according to the best mode for carrying out the invention, the housing frame 51 is a resin molded part. This increases the degree of freedom in selecting the shape of the housing frame 51 and allows the housing frame 51 to be formed integrally with the recess 57 that is the mechanism for positioning the touch panel 10. In addition, when the engagement mechanisms 56 for engagement with the bottom frame 28 of a metal sheet are formed directly in the housing frame 51, resin spacers can be omitted that conventionally need to be inserted as independent members between the top frame 27 and the bottom frame 28. Thus, the number of components can be readily reduced through component integration.

For the above-described reasons, the touch panel assembly 2 according to the best mode for carrying out the invention enables reduction in dimension as well as in the number of components without lowering its functional performance.

INDUSTRIAL APPLICABILITY

According to claim 1 of the present invention, a touch panel assembly comprises:
a spread illuminating device which comprises
a light conductor plate made of a transparent material, and
a rod-like lamp composed of a light conductor rod made of a transparent material and disposed close to and along at least one of the end surfaces of the light conductor plate, and a point light source disposed adjacent to at least one of two ends of the light conductor rod, and in which light, that is emitted from the rod-like lamp, falls incident on the end surface of the light conductor plate and is introduced into the light conductor plate, exits out of the light conductor plate from its major surface toward a display portion of a liquid crystal display device.

In the touch panel assembly, a housing frame to support components of the spread illuminating device in an integral manner is provided with a positioning mechanism for a touch panel, and a touch panel provided with no reinforcement member is fixed to the positioning mechanism fixedly attached.

The configuration described above makes it possible to reduce the thickness of the touch panel itself. Further, since the housing frame to support the components of the spread illuminating device in an integral manner is provided with the positioning portion for the touch panel, and since the touch panel is fixed to the positioning portion, the absence of a reinforcement member is duly compensated for, thus ensuring the strength of the touch panel.

According to claim 2 of the present invention, in the touch panel assembly recited in claim 1, the touch panel positioning mechanism is constituted by a recess formed in the housing frame. This configuration facilitates positioning of the touch panel and at the same time makes it possible to diminish the projection length of the touch panel from the front surface of the housing frame or even to reduce the protrusion to zero when the touch panel is fixed to the housing frame.

According to claim 3 of the present invention, in the touch panel assembly recited in claim 1 or 2, a transparent buffet member is disposed between the touch panel and the light conductor plate. The touch panel with no reinforcement member, when pressed for operation, may be deformed so as to be brought into contact with the light conductor plate, but the transparent buffer member disposed between touch panel and the light conductor plate elastically prohibits contact therebetween and attenuates impact. Thus, a light reflecting pattern that is formed on the light conductor plate is prevented from being damaged, and the light conductor plate is kept from deteriorating in its functional performance.

According to claim 4 of the present invention, in the touch panel assembly recited in claim 3, the transparent buffer member is provided so as to keep clear of a portion of the spread illuminating device, at which the spread illuminating device defines its maximum thickness. This configuration makes it possible to prevent increase in the total thickness of the assembly, which may otherwise result from providing the transparent buffer member between the touch panel and the light conductor plate.

According to claim 5 of the present invention, in the touch panel assembly recited in claim 3 or 4, the transparent buffer member is composed of a polyethylene terephthalate film and a transparent gel layer. This configuration utilizes the mechanical property of the transparent gel layer which, together with the polyethylene terephthalate film, constitutes the transparent buffer member interposed between the light conductor plate and the transparent flat plate, and makes it possible to attenuate deformation of the touch panel that occurs when the touch panel is pressed for operation and to attenuate vibration or impact that is transmitted to the light conductor plate when vibration or impact is exerted on the touch panel.

According to claim 6 of the present invention, in the touch panel assembly recited in claim 5, the polyethylene terephthalate film is either an AR film or an LR film. With this configuration, the AR film or LR film, which, together with the transparent gel layer, is interposed between the light conductor plate and the transparent flat plate, effectively prevents light reflected at the display screen of the display device from being reflected by the touch panel while traveling outward.

According to claim 7 of the present invention, in the touch panel assembly recited in claim 3 or 4, the transparent buffer member is formed such that such either a liquid buffer material or a gel-like buffer material is coated on a surface of the touch panel and a coat surface of the buffer material is hardened for eliminating stickiness. This configuration utilizes the mechanical property of the liquid or gel-like buffer material coated on the surface of the touch panel, and makes it possible to attenuate deformation of the touch panel that occurs when the touch panel is pressed for operation and to attenuate vibration or impact that is transmitted to the light conductor plate when vibration or impact is exerted on the touch panel. In addition, since stickiness is eliminated at the coat surface of the buffer material, the buffer member configured above can be handled as easily as the buffer member composed of the polyethylene terephthalate film and the transparent gel layer.

According to claim 8 of the present invention, in the touch panel assembly recited in any one of claims 5 to 7, a thickness of either the polyethylene terephthalate film or the coat surface portion of the buffer material hardened for eliminating stickiness is set to range from 10 to 500 μm. This configuration provides the transparent buffer member with requisite flexibility, and enables the buffer member to disperse force that is generated when the touch panel is pressed toward the light conductor plate to thereby efficiently prevent the touch panel and the light conductor plate from being damaged.

According to claim 9 of the present invention, in the touch panel assembly recited in any one of claims 5 to 8, a thickness of either the transparent gel layer or an unhardened portion of the liquid or gel-like buffer member coated on the surface of the touch panel is set to range from 50 to 500 μm. This configuration makes it possible to attain the buffer effect without significantly influencing the total thickness.

According to claim 10 of the present invention, in the touch panel assembly recited in any one of claims 3 to 9, a gap ranging from 10 μm to 1 mm is provided between the transparent buffer member and the light conductor plate. With this structure, the transparent buffer member can further reliably prevent the touch panel and the light conductor plate from being damaged by the impact that occurs when the touch panel is pressed for operation.

According to claim 11 of the present invention, in the touch panel assembly recited in any one of claims 3 to 10, a transparent flat plate that constitutes the touch panel having no reinforcement member is a thin tempered glass plate. The touch panel having no reinforcement member, when pressed for operation, is possibly deformed and brought into contact with the light conductor plate, but the transparent buffer member disposed between the touch panel and the light conductor plate elastically prohibits contact therebetween and attenuates impact. Therefore, the degree of freedom in selecting the material of the transparent flat plate can be increased, and a thin tempered glass plate as well as a polyethylene terephthalate film can be used as the transparent flat plate.

According to claim 12 of the present invention, in the touch panel assembly recited in any one of claims 1 to 11, the housing frame is a resin molded part. This configuration increases the degree of freedom in selecting the shape of the housing frame and allows the housing frame to be formed with a touch panel positioning mechanism. In addition, if engagement mechanisms for engagement with a bottom frame of a sheet metal are formed directly in the housing frame, resin parts can be omitted that are conventionally provided in the bottom frame as independent members for attachment of the touch panel assembly.

The invention claimed is:

1. A touch panel assembly in a front-light spread illuminating device, the touch panel assembly comprising:
    a light conductor plate made of a transparent material, the light conductor plate having, on a major surface, a light reflecting pattern;
    a rod-like lamp composed of a light conductor rod made of a transparent material and disposed close to and along at least one of end surfaces of the light conductor plate, and a point light source disposed adjacent to at least one of two ends of the light conductor rod;
    a liquid crystal display device having a display portion in which light, that is emitted from the rod-like lamp, falls incident on the end surface of the light conductor plate and is introduced into the light conductor plate, exits out of the light conductor plate from its major surface toward the display portion of the liquid crystal display device;

a housing frame supporting components of the spread illuminating device in an integral manner and being provided with a positioning mechanism for a touch panel, wherein a touch panel having no reinforcement member is fixed to the positioning mechanism; and a transparent buffer member disposed between the touch panel and the light conductor plate, wherein a gap is provided between the transparent buffer member and the light conductor plate, and wherein the transparent buffer member is composed of a polyethylene terephthalate film and a transparent gel layer, and the transparent gel layer is disposed in contact with the touch panel.

2. The touch panel assembly according to claim 1, characterized in that the touch panel positioning mechanism is constituted by a recess formed in the housing frame.

3. The touch panel assembly according to claim 1, characterized in that the transparent buffer member is provided so as to keep clear of a portion of the spread illuminating device, at which the spread illuminating device defines its maximum thickness.

4. The touch panel assembly according to claim 1, characterized in that the polyethylene terephthalate film is either an AR film or an LR film.

5. The touch panel assembly according to claim 1, characterized in that the transparent buffer member is formed such that either a liquid or gel-like buffer material is coated on a surface of the touch panel and a coat surface portion of the buffer material is hardened for eliminating stickiness.

6. The touch panel assembly according to claim 1, characterized in that a thickness of the polyethylene terephthalate film is set to range from 10 to 500 μm.

7. The touch panel assembly according to claim 1, characterized in that a thickness of the transparent gel layer is set to range from 50 to 500 μm.

8. The touch panel assembly according to claim 1, characterized in that the gap ranges from 10 μm to 1 mm.

9. The touch panel assembly according to claim 1, characterized in that a transparent flat plate that constitutes the touch panel having no reinforcement member is a thin tempered glass plate.

10. The touch panel assembly claim 1, characterized in that the housing frame is a resin molded part.

11. The touch panel assembly according to claim 5, characterized in that a thickness of the coat surface portion of the buffer material hardened for eliminating stickiness is set to range from 10 to 500 μm.

12. The touch panel assembly according to claim 5, characterized in that a thickness of an unhardened portion of the buffer material coated on the surface of the touch panel is set to range from 50 to 500 μm.

13. A touch panel assembly in a front-light spread illuminating device, the touch panel assembly comprising:

a light conductor plate made of a transparent material, the light conductor plate having, on a major surface, a light reflecting pattern;

a rod-like lamp composed of a light conductor rod made of a transparent material and disposed close to and along at least one of end surfaces of the light conductor plate, and a point light source disposed adjacent to at least one of two ends of the light conductor rod;

a liquid crystal display device having a display portion in which light, that is emitted from the rod-like lamp, falls incident on the end surface of the light conductor plate and is introduced into the light conductor plate, exits out of the light conductor plate from its major surface toward the display portion of the liquid crystal display device; and a housing frame supporting components of the spread illuminating device in an integral manner and being provided with positioning mechanisms for the light conductive plate, the point light source, the light conductor rod and a touch panel on a top surface side of the housing frame, and for the display device on a bottom surface side of the housing frame, wherein the touch panel having no reinforcement member is fixed to the positioning mechanism, and wherein the housing frame is configured to receive a first buffer member at the top surface side of the housing frame and a second buffer member at the bottom surface side of the housing frame.

14. The touch panel assembly of claim 13, wherein the first buffer member is a transparent buffer member interposed between the touch panel and the light conductor plate, and the second buffer member is a cushion provided between the bottom surface side of the housing frame and the display device.

15. The touch panel assembly of claim 14, characterized in that FPC is so disposed so as to be interposed between a frame-like seat of the housing frame and the cushion.

* * * * *